United States Patent
Zhou

(10) Patent No.: US 11,023,224 B2
(45) Date of Patent: Jun. 1, 2021

(54) FIRMWARE UPDATE METHOD FOR SMART CHARGING DEVICE

(71) Applicant: CHEN-SOURCE INC., Taoyuan (TW)

(72) Inventor: Bai-Lian Zhou, Taoyuan (TW)

(73) Assignee: Chen-Source Inc., Taoyuan (TW)

( * ) Notice: Subject to any disclaimer, the term of this patent is extended or adjusted under 35 U.S.C. 154(b) by 63 days.

(21) Appl. No.: 16/589,590

(22) Filed: Oct. 1, 2019

(65) Prior Publication Data

US 2021/0096846 A1 Apr. 1, 2021

(51) Int. Cl.
| | |
|---|---|
| G06F 8/656 | (2018.01) |
| G06F 8/658 | (2018.01) |
| H04L 9/08 | (2006.01) |
| G06F 11/10 | (2006.01) |
| H04L 9/32 | (2006.01) |
| G06F 11/14 | (2006.01) |

(52) U.S. Cl.
CPC .............. *G06F 8/656* (2018.02); *G06F 8/658* (2018.02); *G06F 11/1004* (2013.01); *G06F 11/1433* (2013.01); *H04L 9/0894* (2013.01); *H04L 9/3247* (2013.01)

(58) Field of Classification Search
USPC ........................................................ 717/168
See application file for complete search history.

(56) References Cited

U.S. PATENT DOCUMENTS

| | | | | |
|---|---|---|---|---|
| 7,904,895 | B1* | 3/2011 | Cassapakis ............. | G06F 8/654 717/168 |
| 8,161,277 | B2* | 4/2012 | Shih ......................... | G06F 8/65 713/2 |
| 2007/0055969 | A1* | 3/2007 | Yang ................... | G06F 11/1433 717/168 |
| 2007/0169099 | A1* | 7/2007 | Rao .......................... | G06F 8/65 717/168 |
| 2009/0271780 | A1* | 10/2009 | B. ............................ | G06F 8/65 717/173 |
| 2011/0029726 | A1* | 2/2011 | Fujimoto ............ | G06F 11/1433 711/103 |
| 2015/0020060 | A1* | 1/2015 | Bandakka ............... | G06F 8/654 717/171 |
| 2017/0220404 | A1* | 8/2017 | Polar Seminario ......................... G06F 11/0736 |
| 2017/0222815 | A1* | 8/2017 | Meriac .................. | G06F 21/554 |
| 2018/0326291 | A1* | 11/2018 | Tran ......................... | A42B 3/30 |

* cited by examiner

*Primary Examiner* — John Q Chavis
(74) *Attorney, Agent, or Firm* — Muncy, Geissler, Olds & Lowe, P.C.

(57) ABSTRACT

A firmware update method for a smart charging device is disclosed. First, firmware of a first board is updated, and the first board then sets work flags to second, third board and fourth boards. The first board queries a firmware version of the second board, and then presets the work flag of a firmware version as false. When the firmware version of the second board is older, the first board sets the work flag as true, and updates the firmware of the second board, and sets the work flag as false. The first board again queries whether the work flag is set as true, when the firmware versions of the second and first boards are the same, the work flag is set as false. According to the above procedures, the firmware of the third and fourth boards is updated, so as to completely update firmware of all boards.

10 Claims, 5 Drawing Sheets

FIRMWARE UPDATE METHOD FOR SMART CHARGING DEVICE

BACKGROUND OF THE INVENTION

1. Field of the Invention

The present invention relates to a firmware update method for a smart charging device, more particularly to a firmware update method using a master computer to perform energy control and allocation according to information of voltage, current and temperature, collected via a communication interface, of the slave board, and after firmware of a master board is updated, firmware of the slave boards can automatically be updated, and during the process where the master board actively updates the slave boards, a check mechanism is performed on all data, so as to prevent the data from being stolen or broken by hacking from the outside.

2. Description of the Related Art

In recent years, with rapid development of electronic technology and multimedia information, electronic products such as smart phones, tablet computers, and notebook computers are designed toward light, short, and powerful functions to have features of smaller size, lighter weight, and easy carry, and software and hardware of the electronic products are also continuously innovated, so that the electronic products can be used more flexibly and have improved practical effects, and become indispensable devices widely applied in people's work and life entertainment.

However, as the processing speed of the electronic product is improved, the mobile electronic device such as smart phone, tablet computer or notebook computer consumes more power. As a result, when a user operates a mobile electronic product while walking, the battery power of the mobile electronic device is quickly exhausted, and the user needs to find a power socket to charge the battery of the mobile electronic device.

In teaching environment (for example, schools), in order to meet the requirement in digital teaching, teachers and students use mobile electronic devices, such as tablets or notebooks, to replace traditional books for knowledge transfer, so how to conveniently charge the mobile electronics becomes extremely important. Generally, a charging device, such as a charging cabinet or a charging car, can provide a plurality of AC sockets or DC charging sockets, such as USB sockets, disposed thereon to charge the plurality of mobile electronic devices through necessary chargers and charging lines. Some conventional charging devices include a plurality of extensible boards used for controlling charging, and firmware of the plurality of boards can be updated through a computer updating apparatus. However, the conventional firmware update mechanism is incomplete, so a computer operator must carry the computer updating apparatus to the location where the charging device is disposed and manually perform the firmware update operation. As a result, in the conventional update mechanism, the charging devices cannot be updated in time subject to the computer operator scheduling. How to solve above-mention problem becomes a key issue in the industry.

SUMMARY OF THE INVENTION

Therefore, the inventors develop a firmware update method for a smart charging device according to collected data, tests and modifications, and years of research experience, so as to solve the conventional problems.

An objective of the present invention is to provide a firmware update method for a smart charging device, and the firmware update method includes steps of: updating, by a master computer, latest firmware to a first board; setting, by the first board, a plurality of work flags to a second board, a third board and a fourth board; query, by the first board, a firmware version of the second board and presetting a work flag of the firmware version of the second board as false, and when the firmware version of the second board is older than that of the latest firmware, updating the work flag of the firmware version of the second board as true, and then updating, by the first board, the firmware of the second board and setting the work flag of the firmware version of the second board as false; querying again, by the first board, whether the work flag of the firmware version of the second board is true, and when the firmware version of the second board and the first board are the same, setting the work flag of the firmware version of the second board as false; updating firmware of the third and fourth boards according to a procedure of previous steps, to complete firmware update of the boards; during the update process, a check mechanism is performed on all data, so as to prevent the data from being stolen or broken by hacking from the outside.

Another objective of the present invention is that the firmware includes an outside tool/program accesses firmware inside variable/area (OAI) region, a firmware update information storage region, a public key storage region, and a digital signature storage region.

Another objective of the present invention is that the firmware update information storage region is divided into two regions including a first region configured to store an operation firmware, and a second region configured to store an update firmware.

Another objective of the present invention is that a tool software is used to read the OAI region and import and write firmware update information into the firmware update information storage region, the firmware update information includes a CRC32 value and a time serial number, and the firmware is determined as a new version or an old version according to the time serial number.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
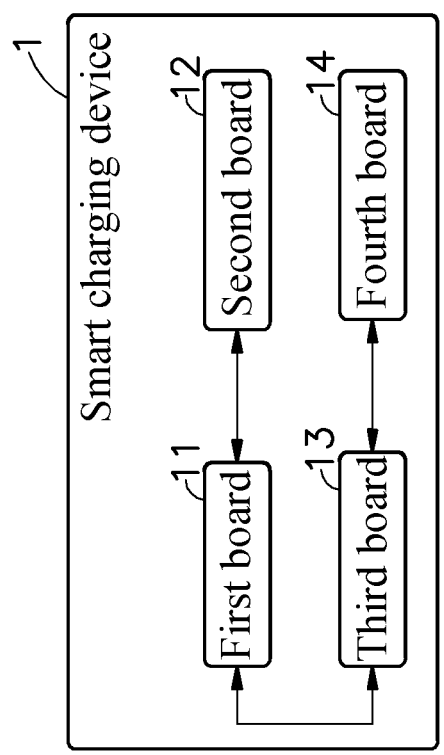
FIG. 1 is a functional block circuit diagram of a smart charging device of the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

Figure 2:
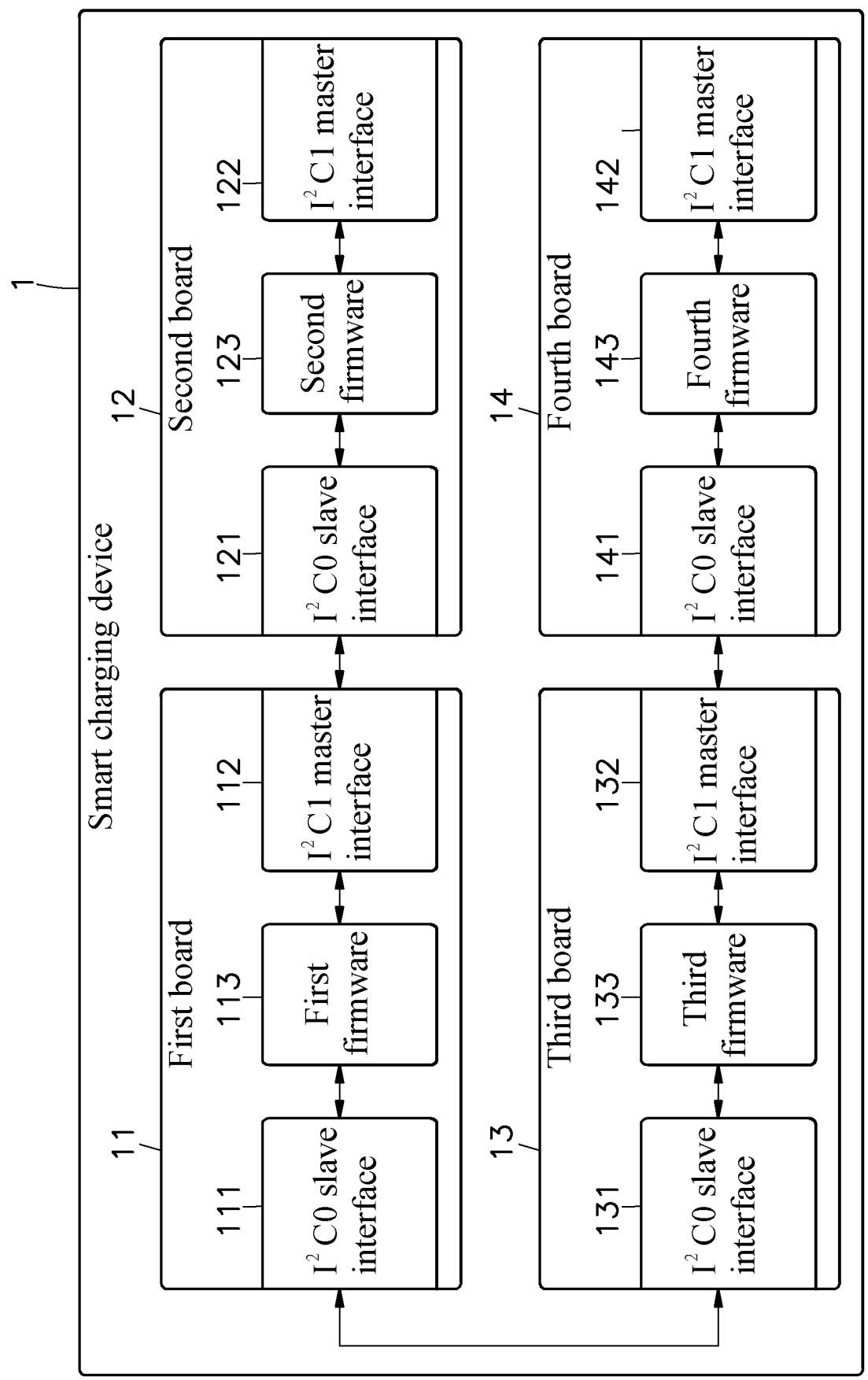
FIG. 2 is a functional block diagram of an operation of using a master computer to update firmware of the smart charging device according to the present invention.
Figure 3:
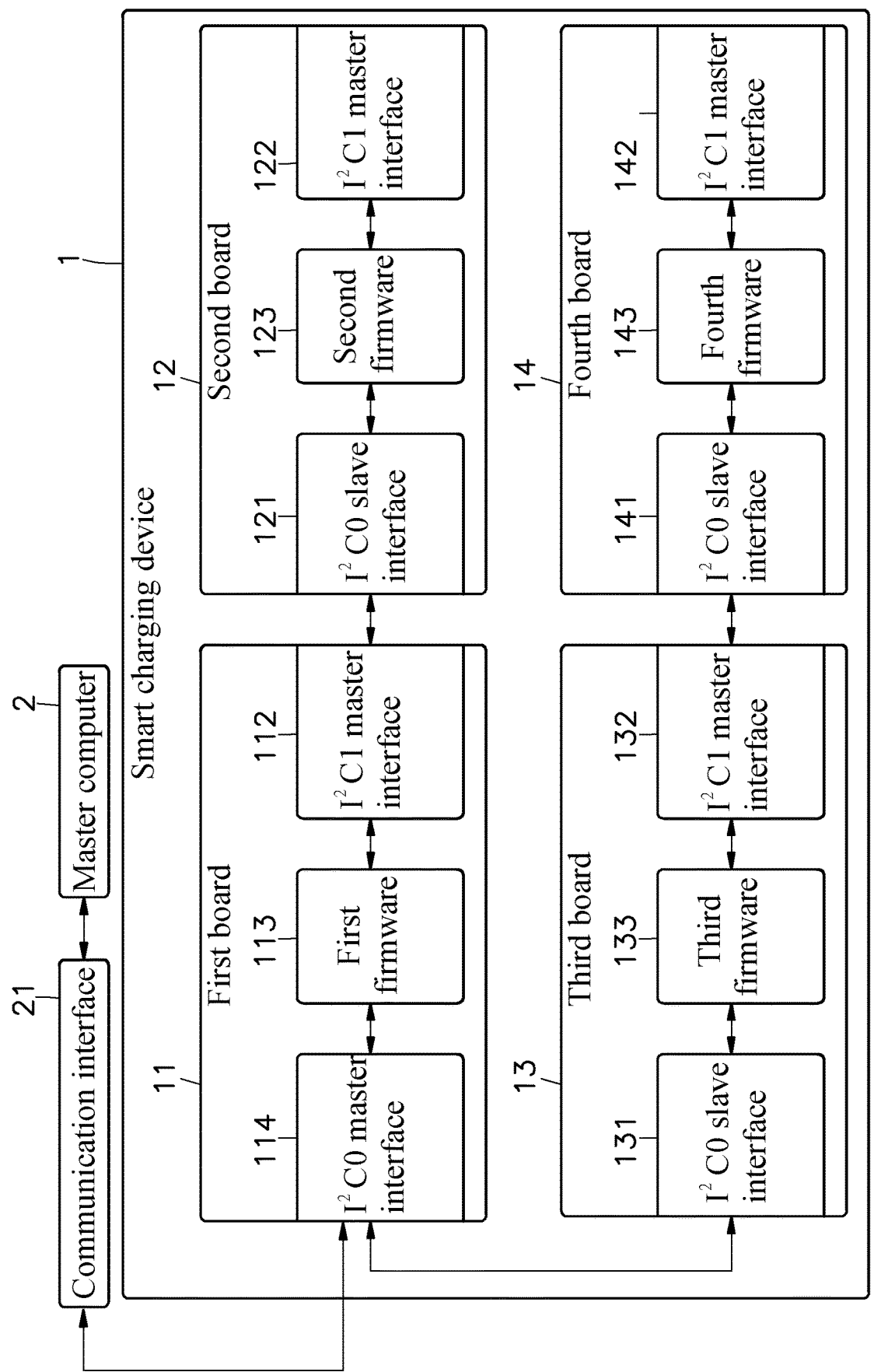
FIG. 3 is a detailed functional block diagram of the operation of using a master computer to update the firmware of the smart charging device according to the present invention.

Please refer to FIGS. 1 to 3, which are a functional block circuit diagram of a smart charging device of the present invention, and a functional block diagram and a detailed functional block diagram of an operation of using a master computer to update firmware of the smart charging device according to the present invention. The smart charging device mainly includes a smart charging device 1 and a master computer 2. The smart charging device 1 includes a first board 11, a second board 12, a third board 13, and a fourth board 14. The functions and connection relationships of the functional blocks are described in detail in following paragraphs.

The present invention provides an energy control system which can be implemented by one or more circuit board, and the key feature of the present invention is to use multiple circuit boards to form a charging system. In the smart charging device 1, one of the multiple circuit boards serves as a master board configured to manage and detect a total output power to control power output of a power supply, and also collect power output states of all slave boards, connected to the charging system, so as to prevent the total power of the power supply of the charging system from overloading. When the total power of the power supply is sufficient to charge the plurality of to-be-charged devices at the same time, all of the master board and the slave boards can charge the plurality of to-be-charged devices in a fully charging mode. When the total power of the power supply is insufficient to charge the plurality of to-be-charged devices at the same time, the master board allocates and divides charging periods of the master board and the slave boards, thereby taking turn to charge the to-be-charged devices in an alternating charging mode. After the alternating charging mode is performed for a period and some of the to-be-charged devices recover partial electrical power, and the total power of the power supply is sufficient to charge all to-be-charged devices at the same time, all of the master board and the slave boards can charge the to-be-charged devices in the fully charging mode until all of the to-be-charged devices are fully charged.

The smart charging device 1 of the present invention can be a charging cabinet or a charging car for charging to tablets or notebook computers, and can provide a charging device with scalability. In the smart charging device 1, the master computer can perform energy control and allocation according to information of voltage, current and temperature, collected via a communication interface 21, of the slave boards. In an embodiment, the communication interface 21 can be Internet, mobile network, local area network (LAN), or wireless local area network (WLAN). After the firmware of the master board is updated, the master board can automatically update the firmware of the slave boards, and during the process where the master board actively updates the slave boards, a check mechanism is performed on all data to prevent the data from being stolen or broken by hacking from the outside.

The first board 11 connected to the master computer is set as a master board, and the remaining boards are set as slave boards. The boards can be recognized by a hardware mechanism; alternatively, a method is required to designate a board number of each board after power on, so that information can be transmitted to the boards based on the board numbers. In order to form a circuit architecture of controlling charging operations in serial, an input interface of the first board 11, which is set as the master board, can be changed from an $I^2C0$ slave interface 111 (as shown in FIG. 2) to an $I^2C0$ master interface 114 (as shown in FIG. 3), and the $I^2C0$ master interface 114 can be used to control the third and four boards 13 and 14.

The first board (master board) 11 can transmit a board number assign instruction to the slave board connected to the $I^2C1$ master output interface thereof, so as to inform the corresponding slave board to be the second board 12.

The first board 11 transmits the board number assign instruction to the slave board connected to the $I^2C0$ master input interface thereof, so as to inform the corresponding slave board to be the third board 13.

The third board 13 transmits the board number assign instruction to the slave board connected to the $I^2C1$ master output interface thereof, so as to inform the corresponding slave board to be the fourth board 14.

After the step of assigning the board numbers to the corresponding boards is completed, the master board (first board 11) can communicate with slave boards including the second board 12, the third board 13 and the fourth board 14.

The input/output interfaces of the first board 11 include the $I^2C0$ master interface 114 and an $I^2C1$ master interface 112, and a first firmware 113 is disposed between the input/output interfaces. The input/output interfaces of the second board 12 include an $I^2C0$ slave interface 121 and an $I^2C1$ master interface 122, and a second firmware 123 is disposed between the input/output interfaces. The input/output interfaces of the third board 13 include an $I^2C0$ slave interface 131 and an I²C1 master interface 132, and a third firmware 133 is disposed between the input/output interfaces. The input/output interfaces of the fourth board 14 include an I²C0 slave interface 141 and an I²C1 master interface 142, and a fourth firmware 143 is disposed between the input/output interfaces. The other of the plurality of numbered extension boards, such as a fifth board, a sixth board, . . . an Nth board, are similarly assigned with board numbers and have configurations similar to aforementioned configurations.

Figure 4:
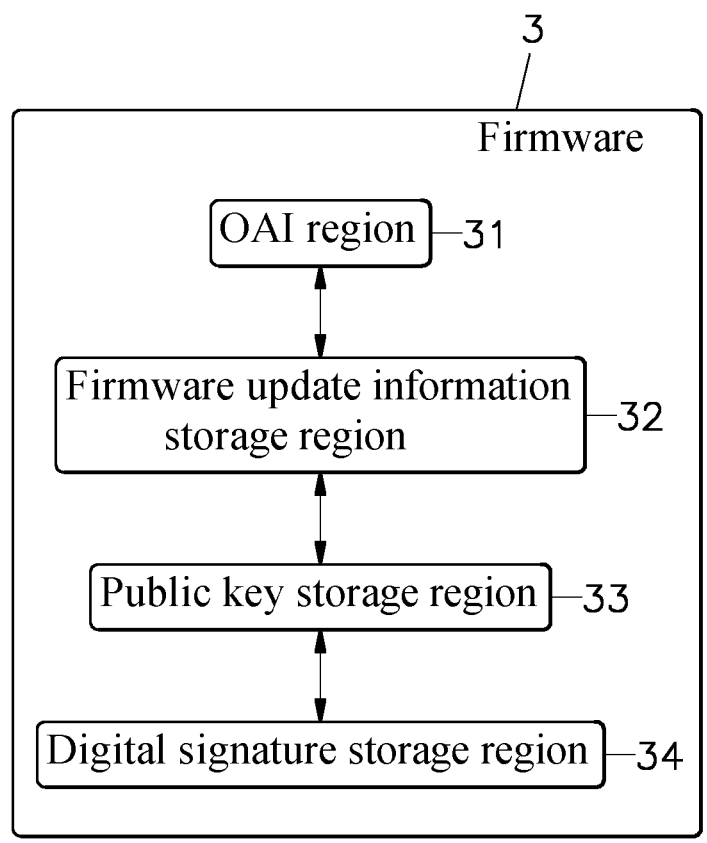
FIG. 4 is a structural view of firmware storing information according to the present invention.

Please refer to FIG. 4, which is a structural view of the firmware storing information according to the present invention. A firmware 3 (such as one of the first firmware 113, the second firmware 123, the third firmware 133 and the fourth firmware 143) includes an outside tool/program accesses firmware inside variable/area (OAI) region 31, a firmware update information storage region 32, a public key storage region 33 and a digital signature storage region 34. The firmware update information storage region 32 is divided into two regions, which are not shown in figures. The two regions include a first region configured to store an operation firmware, and a second region configured to store an update firmware. A tool software, which is not shown in figures, can be used to read the OAI region 31, and import and write firmware update information, which is not shown in figures, into the firmware update information storage region 32. In an embodiment, the firmware update information can include a CRC32 value and a time serial number, and the firmware can be determined as a new version or an old version according to the time serial number.

Figure 5:
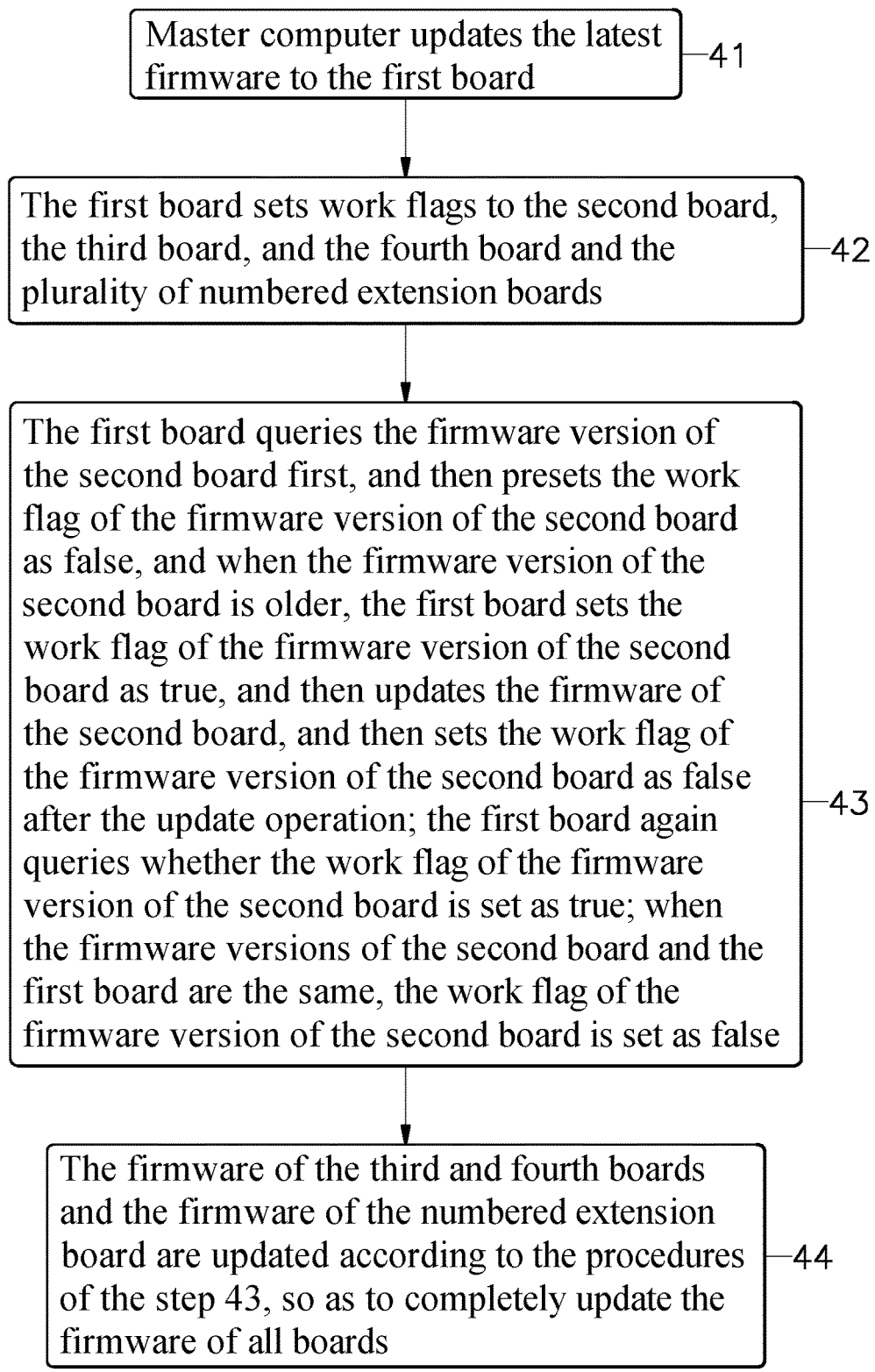
FIG. 5 is a flowchart of a firmware update method for a smart charging device of the present invention.

Please refer to FIG. 5, which is a flowchart of a firmware update method for a smart charging device of the present invention. The firmware update method can be performed according to following steps.

In a step 41, the master computer updates the latest firmware to the first board, which is also called as master board herein.

In a step 42, after the step of assigning the board numbers to the boards is completed, the first board sets the plurality of work flags to the second board, the third board, and the fourth board and the plurality of numbered extension boards, and the work flags are used to determine whether the update operations are completed in later steps.

In a step 43, the second board is updated according to procedures below. The first board queries the firmware version of the second board first, and then presets the work flag of the firmware version of the second board as false, and when the firmware version of the second board is older, the first board sets the work flag of the firmware version of the second board as true, and then updates the firmware of the second board, and then sets the work flag of the firmware version of the second board as false after the update operation; the first board again queries whether the work flag of the firmware version of the second board is set as true, and the purpose of querying the second board again is to query the firmware version again, so as to determine whether the firmware is indeed updated, when the work flag is true, the update operation is performed; and when the work flag is false, no action is performed; when the firmware versions of the second board and the first board are the same, the work flag of the firmware version of the second board is set as false.

In a step 44, the firmware of the third and fourth boards and the firmware of the numbered extension board are updated according to the procedures of the step 43, so as to completely update the firmware of all boards.

According the contents disclosed in FIGS. 1 to 5, the present invention provides the firmware update method for the smart charging device, and in the firmware update method, the master computer updates the latest firmware to the first board; the first board sets the plurality of work flags to the second board, the third board, and the fourth board; the first board queries the firmware version of the second board first, and presets the work flag of the firmware version of the second board as false; when the firmware version of the second board is older, the first board updates the work flag of the firmware version of the second board as true, and then updates the firmware of the second board, and then sets the work flag of the firmware version of the second board as false after the update operation; the first board queries again whether the work flag of the firmware version of the second board is set as true, and when the firmware versions of the second board and the first board are the same, the first board sets the work flag of the firmware version of the second board as false; the firmware of the third and fourth boards is updated according to the procedures of previous step, so as to completely update the firmware of the boards. As a result, the firmware update method of the present invention has excessive high security and high update efficiency.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A firmware update method for a smart charging device, comprising:
   (A) updating, by a master computer, a latest firmware to a first board;
   (B) setting, by the first board, a plurality of work flags to a second board, a third board, a fourth board and a plurality of numbered extension boards;
   (C) querying, by the first board, a firmware version of the second board and presetting the work flag of the firmware version of the second board as false, and when the firmware version of the second board is older, setting, by the first board, the work flag of the firmware version of the second board as true and updating the firmware version of the second board, and then setting the work flag of the firmware version of the second board as false, and querying again, by the first board, whether the work flag of the firmware version of the second board is set as true, and when the firmware version of the second board is the same as the firmware version of the first board, setting the work flag of the firmware version of the second board as false;
   (D) according to the procedures of step (C), updating firmware of the third and fourth boards and the plurality of numbered extension boards, so as to completely update the firmware of each of the second board, the third board, the fourth board and the plurality of numbered extension boards.

2. The firmware update method according to claim 1, wherein input/output interfaces of the first board comprise an I²C0 master interface and an I²C1 master interface.

3. The firmware update method according to claim 1, wherein input/output interfaces of each of the second, third and fourth boards and the plurality of numbered extension boards comprise an I²C0 slave interface and an I²C1 master interface.

4. The firmware update method according to claim 1, wherein the first board transmits a board number assign instruction to the corresponding board connected to an I²C1 master interface thereof, to informs the corresponding board to be the second board.

5. The firmware update method according to claim 1, wherein the first board transmits a board number assign instruction to the corresponding board connected to an I²C0 master interface thereof, to inform the corresponding board to be the third board.

6. The firmware update method according to claim 1, wherein the third board transmits a board number assign instruction to the corresponding board connected to an I²C1 master interface thereof, to inform the corresponding board to be the fourth board.

7. The firmware update method according to claim 1, wherein the smart charging device is a charging cabinet or a charging car.

8. The firmware update method according to claim 1, wherein a firmware comprises an outside tool/program accesses firmware inside variable/area (OAI) region, a firmware update information storage region, a public key storage region, and a digital signature storage region.

9. The firmware update method according to claim 8, wherein the firmware update information storage region is divided into two regions comprising a first region configured to store an operation firmware, and a second region configured to store an update firmware.

10. The firmware update method according to claim 8, wherein a tool software is used to read the outside tool/program accesses firmware inside variable/area (OAI) region, and import and write firmware update information into the firmware update information storage region, and the firmware update information comprises a CRC32 value and a time serial number, and the firmware is determined as a new version or an old version according to the time serial number.

* * * * *